Feb. 14, 1933.  C. M. CHAPMAN  1,897,238
STRUCTURAL UNIT AND PROCESS FOR MAKING SAME
Filed Dec. 23, 1927
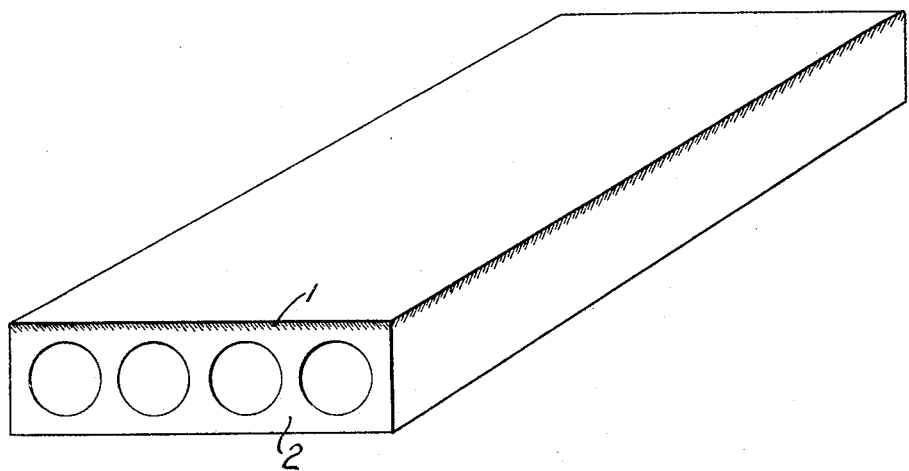
Cloyd M. Chapman
INVENTOR Patented Feb. 14, 1933

1,897,238

UNITED STATES PATENT OFFICE

CLOYD M. CHAPMAN, OF DOUGLASTON, NEW YORK

STRUCTURAL UNIT AND PROCESS FOR MAKING SAME

Application filed December 23, 1927. Serial No. 242,301.

My invention relates to structural units and portions of structures containing gypsum or the like which are adapted to receive a coating of mortar or stucco. One object of my invention is to provide a structural unit containing gypsum having one or more surfaces chemically prepared for the reception of a mortar containing cement, and to which such mortar will tenaciously adhere.

A second object is to provide a process for the treatment of the surface of a material containing gypsum such that an applied mortar containing cement will securely bond thereto.

It is generally known that gypsum blocks such as are in common use for the construction of interior walls and partitions may not be used for exterior walls which will be exposed to the weather, for the reason that gypsum will rapidly absorb moisture during rains and when wet loses much of its strength. Cement mortar will not adhere to or bond with gypsum or plaster-of-Paris and therefore it has been found impractical to protect gypsum structures by means of a cement mortar coat or stucco. Whenever this has been attempted the cement mortar coat has soon become loose and scaled off leaving the gypsum surface unprotected.

The same difficulty is experienced in the case of floors, ceilings and roofs constructed either of precast gypsum units or of gypsum slabs formed in place in the structure by pouring freshly mixed cementitious materials containing gypsum and water into a form. The difficulty arises from the failure of portland cement mortar coats to bond with or firmly adhere to the gypsum base. It has therefore been impracticable to finish floors, ceilings or roofs having a base of gypsum with a coat of mortar applied direct to the gypsum, as it is often very desirable to do.

I have found that by a chemical treatment of the surface of material containing gypsum to which it is desired to apply a mortar coat of cement or of cement and aggregate, it is possible to secure such a tenacious bond between the gypsum and the mortar that no separation takes place. In fact, by the use of my invention, the plane of contact between the two materials becomes the strongest portion of the composite structure.

In the accompanying drawing I have shown a gypsum block 2 of the type commonly used in the construction of interior partitions, the surface portion 1 of which is treated in accordance with my invention.

I find that by treating the surface containing gypsum or plaster-of-Paris which has set or partly set with a solution containing a chloride, there is formed a surface to which cement mortar when applied will adhere so strongly that upon attempting to separate them, no cleavage plane is found to exist at the surface of contact. The two materials, namely, the gypsum and the mortar, may be broken at any other place more readily than at the surface of contact. I find that many chlorides have the ability to produce this condition on the surface of gypsum, such, for example, as the chlorides of calcium, magnesium, zinc, iron, etc. I also find that various strengths of solutions of these chlorides may be applied to the gypsum to produce the desired result. It has been noted, however, that when very weak solutions are used, such, for example, as a solution containing one pound or less of the chloride to one gallon of water, that a considerable more of the solution must be applied to the gypsum to produce a strong and tenacious bond with a coating containing cement. I also find that these chemicals may be applied to the gypsum either at the time the gypsum is moulded into form and has hardened to a point when it will not show finger prints, or they may be applied after the gypsum has set and hardened and dried out. Or the treatment may be applied to the gypsum surface immediately before the cement mortar coat is applied. Whether prepared by one or another of these methods the gypsum so treated presents a surface to which cement mortar will adhere with extreme tenacity. As to the chloride used in preparing the gypsum for the reception of mortar, I prefer to use calcium chloride on account of its availability and low cost but other compounds containing chlorides may under some circumstances be preferred. For example, I find that the spent solution of chloride of iron which has been used for etching copper half-tone plates in the photo-engraving industry to be a suitable medium for use in carrying out my invention.

Obviously my invention may be applied to the surface of gypsum or plaster-of-Paris which has been cast in place in a structure as well as to precast structural units of this material. It may also be applied to materials composed partially but not entirely of gypsum or plaster-of-Paris. I do not intend to limit its application to any particular kind of structure or structural unit or to any particular composition of material.

I am aware that structural units have been produced with roughened surfaces to provide a mechanical bond for receiving mortar, but with my process no such mechanical bond is necessary as the cement in the mortar will be bonded to the gypsum by chemical action. My new structural unit may have a relatively smooth surface, without grooves or ridges or other form of rough or uneven surface such as have been depended upon in the past for providing a bond with a mortar coat applied to such surface. My new structural unit is therefore quicker, easier and simpler to mould or form and by the simple application to its surface of a chemical treatment is prepared for the reception of a coat or layer of cement or cement mortar. My invention is distinguished from previously known forms of gypsum containing structural units adapted to receive a cement mortar coat by the absence of means for providing a mechanical bond and by the presence of a material on or in the surface of the unit by virtue of which an applied coat of cement mortar will, when set, tenaciously adhere thereto.

What I claim to be new and novel and on which I pray that Letters Patent be granted are:

1. A portion of a structure containing gypsum the surface portion of which contains a chloride rendering it capable of bonding with a coating containing cement.

2. A portion of a structure, containing gypsum, having its surface treated with a chloride, to prepare it for the reception of a coating containing cement.

3. The process of preparing the surface of a structure containing gypsum, for the reception of a coating containing cement, which consists in treating the surface with a chloride.

4. The process of preparing the surface of a structure composed of a material containing gypsum for the reception of a coating containing cement which consists of impregnating the surface with a solution of a chloride.

5. The process of preparing the surface of a structural unit containing gypsum for the reception of a coating containing cement which consists of applying a chloride to the surface.

6. The process of preparing a structural unit containing a gypsum to provide a bond for a coating containing cement which consists of adding a chloride to the surface portion thereof at the time of moulding said unit.

7. A structural unit containing gypsum, having a surface portion composed partially of a chloride, providing a surface to which an applied coating containing cement will tenaciously adhere.

8. A structural unit containing gypsum, having a surface portion treated with a chloride, providing a surface to which an applied coating containing cement will tenaciously adhere.

9. A structural unit containing gypsum, having a surface portion impregnated with a chloride, providing a surface to which an applied coating containing cement will tenaciously adhere.

10. A structural unit containing gypsum, having a surface portion composed partially of calcium chloride providing a surface to which an applied coating containing cement will tenaciously adhere.

11. A portion of a structure containing gypsum, having a surface portion composed partially of calcium chloride providing a surface to which an applied coating containing cement will tenaciously adhere.

12. The process of preparing the surface of a material containing gypsum to provide a bond for a coating containing cement which consists in adding calcium chloride to the surface.

Signed at New York city in the county of New York and State of New York, this 22nd day of December, A. D. 1927.

CLOYD M. CHAPMAN.